(No Model.)
J. D. WATTERS.
CATTLE FASTENING AND RELEASING DEVICE.
No. 264,804. Patented Sept. 19, 1882.
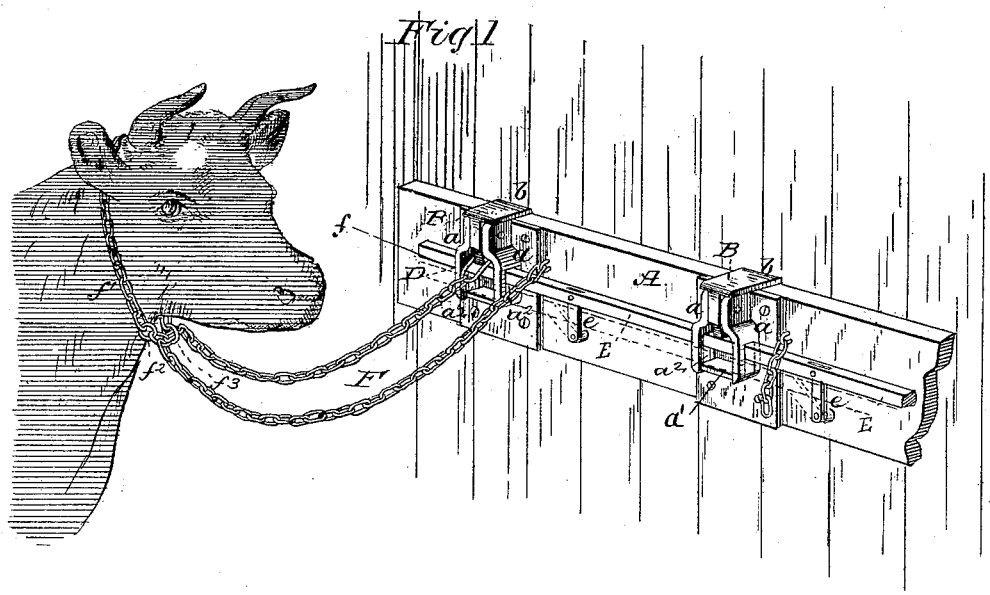
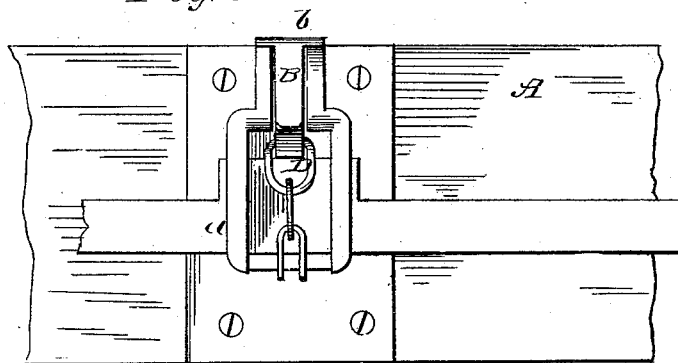
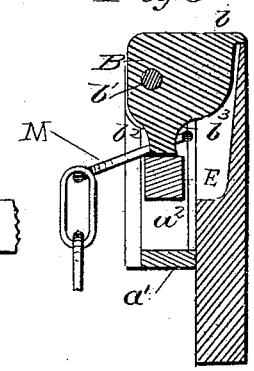
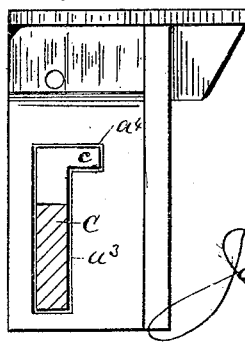
WITNESSES:
Fred G. Dieterich
Solon C. Kemon
INVENTOR:
James D. Watters
BY
ATTORNEYS.

UNITED STATES PATENT OFFICE.

JAMES D. WATTERS, OF BELAIR, MARYLAND.

CATTLE FASTENING AND RELEASING DEVICE.

SPECIFICATION forming part of Letters Patent No. 264,804, dated September 19, 1882.

Application filed February 20, 1882. (No model.)

*To all whom it may concern:*

Be it known that I, JAMES D. WATTERS, of Belair, in the county of Harford and State of Maryland, have invented a new and useful Improvement in Fastening and Releasing Devices for Cattle-Stalls; and I do hereby declare that the following is a full, clear, and exact description of the same.

This invention relates to that class of devices which are adapted to permit the fastening and unfastening individually of any one animal, and also the releasing simultaneously of the entire number when desired; and it consists in the peculiar construction and arrangement of the parts, as hereinafter more fully set forth.

In the drawings, Figure 1 represents a perspective view of one form of my improved device as used in connection with my improved chain for securing an animal; Fig. 2, a front elevation of another form; Fig. 3, a transverse section of Fig. 1, and Fig. 4 an end view of the form shown in Fig. 2.

A, Fig. 2, represents what may be termed a "base-plate" adapted for attachment in any proper manner to front board of the feed-trough or manger, or to the wall of the stall above the manger, which is provided with the side plates, $a\ a$, and an end plate, $a'$, as shown. The upper ends of the side plates, it will be observed, are brought close together and provided with suitable bearings for the pivot-shaft of the gravity-lock, as shown. $a^2\ a^2$ represent slots in the lower portion of the side plates, having a vertical portion, $a^3$, and a horizontal portion, $a^4$, as shown.

B represents the gravity-lock, consisting of a block nearly triangular in form, which is provided above with an overhanging top plate, $b$; near its vertical center, toward the front edge, with a pivot-opening, $b'$, as shown; at its front lower corner with a curved recess, $b^2$, and at its rear lower corner with a curved recess, $b^3$, as shown. An excess of the material of the lock, it will be observed, is located in rear of the pivot-point, and hence the action of gravitation serves to maintain the same in its proper normal position, excepting when moved by a positive force.

C, Fig. 2, represents a bar extending the entire length of the line of stalls, which is provided at proper intervals with the right-angled extension, $c$, as shown.

One of the devices having the gravity-lock, it will be understood, is located in each stall in a horizontal and vertical plane which is common to all the stalls, and the long bar C extends through the side plates, $a\ a$, as shown, its right-angled extension corresponding exactly with the slots when the bar is in its normal position, as shown.

D represents a link at one end of a chain, the other end of which is secured in any proper manner about the neck of the animal to be fastened.

The operation is substantially as follows: The parts being in their normal position, as shown in Fig. 3, and an animal having entered the stall with the chain upon its neck, the end link of the loose end of the chain is pushed inward against the curved recess $b^2$ of the lock B, the latter swinging freely backward to permit its entrance until the end of the entering link passes beyond the lower end of the lock, when the latter, being unsupported, falls into its recess and secures it against return. The gravity-lock, it will be understood, is positively held by the overhanging portions of the top plate, $b$, against movement in an outward direction from its normal position, so that no disengagement of the link can occur while the parts are in their normal positions. Any individual animal, however, may be readily released when desired by simply reversing the action before described, as follows: The gravity-lock being swung inward on its pivot until its lower end is raised up out of the recess of the link, the latter is consequently disengaged and permitted to drop out. The entire number of animals in the line of stalls may be simultaneously released by sliding the bar C far enough to remove the horizontal portion of its right-angled extension from beneath the links, when the latter, being unsupported, will of course fall off from the lower end of the lock.

Certain modifications of the described construction may be made, if desired. For example, instead of the bar C, (shown in Fig. 2,) adapted to slide in a horizontal plane, a bar, E, adapted to swing upon pivoted arms, may be employed, as shown in Figs. 1 and 3. $e\ e$ represent arms, each of which is pivoted at one end to any proper point of support and at the other end to the bar E, as shown. When the bar E is in its normal position the link of the fastened chain is supported by its upper surface in precisely the same manner as it is by the bar C. When the bar is swung upon its pivot-arms the link of course is left unsupported, and the same falls out, as before. In this construction the slots in the side plates, $a\ a$, are modified in form, as shown.

Instead of a link upon the chain for securing the cattle, any equivalent device may be employed—such, for example, as a plate having an opening in it to receive the end of the lock.

In connection with this device a special construction of chain for securing the animal may be employed, if desired.

F, Fig. 1, represents a proper length of chain, one end of which is permanently secured to the wall of the stall above the manger, and the other end of which is provided with a link, $f$, of proper size and form, as shown. $f'$ represents an auxiliary chain of proper length to go about the neck of the animal to be secured, which is attached at one end to the chain F, near the center of the same, by means of a ring, $f^2$, and is provided at the other with a ring, $f^3$, as shown.

The manner of using the chain is substantially as follows: The portion $f'$ having been placed around the neck of the animal, the same is secured in place by passing the link $f$ and that portion of the chain attached thereto, which is between the link and the ring $f^2$, through the ring $f^3$. The end of link $f$ is then secured by the gravity-lock, as before described.

The operation is as follows: When the sliding bar is actuated to release the link the latter, with its attached length of chain, slides through the ring $f^3$ and becomes entirely disengaged from the animal.

Having thus described my invention, what I claim, and desire to secure by Letters Patent, is—

1. The combination, with a casing adapted to be attached to a manger, and a gravity-block pivoted in said casing, of a pivoted releasing-bar lying in its highest position in contact with the end of the gravity-block, substantially as described.

2. The combination, with the base-plate A, provided with the slotted side plates, $a$, of the gravity-block B, pivoted between the side plates, and having its lower end reduced and provided with the overlapping plate $b$, and the releasing-bar F lying in its highest position in contact with the reduced end of the gravity-block, substantially as described, and for the purpose set forth.

3. The combination, with the chain F, provided with the link $f$, of the chain $f'$, having one end secured to the chain F and its other provided with the ring $f^3$, substantially as and for the purpose set forth.

JAMES D. WATTERS.

Witnesses:
JOHN BAUER,
RICHARD T. MARTIN.